United States Patent [19]

Scriver

[11] Patent Number: 4,705,819
[45] Date of Patent: Nov. 10, 1987

[54] PROCESS FOR PREPARING RUBBER COMPOSITIONS

[75] Inventor: Richard M. Scriver, Luxembourg, Luxembourg

[73] Assignee: The Goodyear Tire & Rubber Company, Akron, Ohio

[21] Appl. No.: 710,784

[22] Filed: Mar. 11, 1985

[51] Int. Cl.$^4$ .............................. C08K 3/04; C08J 3/20
[52] U.S. Cl. ..................................... 523/351; 524/526
[58] Field of Search ......................... 523/351; 524/526

[56] References Cited

U.S. PATENT DOCUMENTS

| | | | |
|---|---|---|---|
| 2,239,659 | 4/1941 | Bradley | 523/351 |
| 4,005,053 | 1/1977 | Briggs et al. | 523/351 |
| 4,321,168 | 3/1982 | Veda et al. | 523/351 |
| 4,323,485 | 4/1982 | Ahagon et al. | 525/237 |
| 4,342,670 | 8/1982 | Ahagon et al. | 523/353 |
| 4,417,005 | 11/1983 | Tokieda et al. | 523/351 |

FOREIGN PATENT DOCUMENTS 112445  9/1975  Japan .

Primary Examiner—Herbert J. Lilling
Attorney, Agent, or Firm—H. C. Young, Jr.

[57] ABSTRACT

A process for preparing rubber compositions comprised of a (a) 100 parts rubber material including 65–100 parts of cis-polyisoprene and optionally at least one additional high unsaturation rubber, (b) 40–70 parts Carbon Black and (c) conventional vulcanization and processing additives.

The composition is mixed in two consecutive stages, in the first stage all the carbon black is mixed with at least 50 parts of the cis-polyisoprene, and in the second stage the remaining polyisoprene and any optional additional rubber is added to the mix.

This method of mixing material has been observed to produce a rubber composition having enhanced tear and adhesion properties as compared with conventional processes where the rubber is mixed with the carbon black in one mixing stage.

Thus, the invention is also directed to the resulting rubber composition and to a composite of such composition containing a filament reinforcement.

5 Claims, No Drawings

PROCESS FOR PREPARING RUBBER COMPOSITIONS

FIELD

This invention relates to the preparation of rubber compositions by the incorporation of carbon black therein. It particularly relates to a process of mixing carbon black and rubber by a two stage process and the resulting rubber compositions are particularly useful for the manufacture of tire reinforcement plies.

It is known that when two or more elastomers are compounded with carbon black, that the carbon black is unequally distributed amongst the different polymer phases. In a paper by Sircar and Lamond, Rubber Chem Tech 46 (1973) 178, a number of different rubbers are compounded with polybutadiene in 50:50 mixtures and the carbon black added in various methods to the different polymers. It was demonstrated that the carbon black migrated from a low unsaturation polymer to a high unsaturation polymer irrespective of how the black was added.

A second paper by Sircar, Lamond and Pinter, Rubber Chem Tech 47 (1974) 48 studied the effect of the carbon black distribution on the properties of polymer blends. The blends were all formed from a 50:50 mixture of two polymers, for example natural rubber (NR) and polybutadiene (BR) and the black added to one polymer and then diluted with the second. The results showed that a carbon black-rich compound of the first elastomer was suspended in a carbon black-free second elastomer. It was noted that NR/BR blends which contained unloaded NR have cut growth properties not significantly different from conventionally mixed compounds, and that superior cut growth resistance was observed for NR/BR blends containing unload BR.

Another paper by Hess & Cherico, Rubber Chem Tech 50 (1977) 301 also studied the effect of carbon black distribution on polymer blend properties. Again 50:50 blends of two polymers were taken, but this time each polymer was mixed with carbon black to form a master batch prior to blending with the other of the two polymers.

In all the master batch blending studies it was shown that the black/polymer phase distribution reflected the initial carbon black loadings thus demonstrating that there is no significant phase transfer of the carbon black from one polymer to the other. For NR/BR blends it was shown that tear strength was highest with a 75% loading of black in the NR and lowest with high black loading in the BR. This is apparently related to a high black loading in the continuous polymer phase and in NR/BR the most continuous polymer mesh was formed by adding black preferentially to the NR. This type of mixing gave higher tear resistance compounds.

None of the above papers demonstrates or discusses the possibility of obtaining a non-uniform carbon black distribution in a single polymer, or a polymer blend having a single polymer as a major component thereof.

DISCLOSURE AND PRACTISE OF THE INVENTION

Accordingly there is provided a process for preparing a rubber composition comprised of (A) 100 parts by weight of rubber including 65 to 100 parts by weight of cis 1-4polyisoprene and 0-35 parts by weight of at least one additional high unsaturation rubber;

(B) 40-70 parts by weight of carbon black and (C) rubber vulcanisation aids including accelerators and sulphur, and other additives, such as zinc oxide, stearic acid or stearate and resins.

The process comprising mechanically mixing processing the composition under shear conditions in at least two consecutive stages, in the first stage all the carbon black is mixed with at least 50 parts by weight of the cis 1-4 polyisoprene characterized in that at the first stage, the number of parts of cis-polyisoprene does not exceed more than 80% of the total polyisoprene content of the rubber and in the second stage the remaining cis 1-4 polisoprene and other rubber, if present, is mixed into the composition.

In one embodiment of the invention, the 100 parts by weight of rubber consists of natural rubber, (preferably 60-70 parts in first stage) and by mixing the natural rubber with carbon black, (preferably 55 to 60 parts by weight) in two stages it has been observed that the tear strength of the natural rubber composition is unexpectedly increased. This is somewhat contrary to the findings of the Sircar, Lamond and Pinter paper referenced above, in which it was indicated that blends containing unloaded NR did not have significantly different cut growth properties as compared with conventionally mixed compounds.

In a second embodiment of the invention, the 100 parts by weight of rubber include 1-35 parts, preferably 10-20 parts by weight of polybutadiene. Preferably the cis 1-4 polyisoprene and polybutadiene rubbers are blended together prior to adding at the second stage. The addition of the unfilled polyisoprene and polybutadiene rubber introduces unfilled phases into the composition and it is considered that the unfilled polyisoprene will provide improved tear strength and the unfilled BR gives improved adhesion and fatigue resistance. By blending the polyisoprene and the BR prior to addition at the second stage we obtain an interaction between the two rubbers and when added as a blend at the second stage, this gives improved fatigue resistance. The invention will be described by way of the following examples which are representative of the scope of the invention. All parts in the compositions of the various compounds are given in parts by weight.

Rubber compounds which are particularly useful for tire reinforcement composites in particular carcass plies and breaker plies were formulated by mixing various amounts of Natural Rubber and polybutadiene (total rubber=100 parts) together with about 60 parts of Carbon Black (HAF type), and conventional rubber compounding ingredients such as zinc oxide, stearic acid, silica, antidegradants, peptisers, resin(s), sulphur and accelerators.

It is to be noted that the compositions used in the following examples are identical except that they have only differing amounts of Natural Rubber (NR) and polybutadiene (BR).

The conventional single stage mixed control compositions were mixed in a laboratory according to the following procedures:

(a) Into a 3 liter Shaw Intermix were added all the ingredients except accelerators, sulphur, some peptizer and some resin. After about 4 minutes mixing time the mix temperature reached about 160° C. and the batch was dropped from the mixer.

(b) After an interval of about 24 hours the batch was further mixed for about 2 minutes until it reached 120° C. and was dropped from the mixer.

(c) After a further interval of about 24 hours the batch was further mixed for 1-2 minutes with the sulphur, accelerator, resin and peptizer until the mix temperature reached about 100° C.

This final batch was then processed by a two roll mill into sheet form to produce test samples.

The two-stage mixed compositions were produced according to the invention as follows:

The first stage mix comprises:

(I) For step (a) above except that only a portion of the natural rubber is placed in the 3 liter Shaw Intermix.

(II) As for (b) above.

The second stage mix comprises:

(III) The remaining natural rubber plus any polybutadiene is added to the material and the batch mixed for about 4 minutes until a temperature of 160° was reached and then dropped from the mixer.

(IV) as for step (b) above.

(V) as for step (c) above.

The following tests were used to evaluate the rubber compositions:

| | |
|---|---|
| (a) Tensile Modulus at 300% Extension | (ASTMS D412) |
| (b) Rebound Hot | (ASTMS D1054) |
| (c) Demattia Flexlife | (ASTMS D813) |
| (d) Wire adhesion (S.B.A.T.) | (ASTMS D2229) |

Also the following non-standard tests were used:

(e) Compound Adhesion Test

Samples of the elastomeric test material are formed in sheets (152 mm × 101 mm × 2.4 mm) and two sheets are laminated to form a sandwich with polyester film layer between the two sheets. The film has rectangular apertures 60 mm × 5 mm so that the two sheet contact each other through the apertures. Each outer side of the elastomeric material is then backed by a reinforcing fabric layer, having cords in the direction of tear. After curing the test sheets are cut into 2.54 mm wide strips with the apertures running down the middle of the strip. The two end tabs at one end of the strip are placed in the jaws of a stress-strain tester and pulled apart at 50 cm/min thereby pulling apart the joint formed at the aperture between two elastomeric layers. The test was performed at 100° C.

(f) Hot Instron Tear Test

Samples of the elastomeric material are cured in 152 mm × 76 mm × 12.7 mm slabs which are aged for 7 days at 90° C. and are then cut into 152 mm × 25.4 mm strips. The strips are then fitted into a jig and cut along both longitudinal edges to leave an uncut longitudinally extending portion in the center of the stip of a width of 6.4 mm–7.6 mm. One end of each strip is then also cut to a depth of about 57 mm to provide tab ends for placing in testing jaws.

The tab ends are then fitted into the jaws of a stress-strain tester and pulled apart at 50 cm/min.

After tearing, the tear width is measured and the tear value calculated.

(g) Textile Cord Adhesion

Samples of the cord are calendered with the elastomeric test material. Samples of 75 mm × 140 mm are cut with the cord extending parallel with the 75 mm sides of the sample. The sample is then cut into two 75 mm × 75 mm portions and a 25 cm × 75 cm strip of holland cloth placed along the top edge of one portion running across the cords. The second portion is placed on top forming a two layer 75 cm × 75 cm pad which is then cured. Two 25 mm strips parallel with the cord are cut out of the pad on each side of its center line so that each strip has two 25 mm long tabs at one end. The strips are heated to 120° C. and the tabs placed in the jaws of a stress-strain tester. The jaws are separated at a speed of 5 cm/min. The adhesion is reported as load required to separate the two cord-reinforced layers.

Note: Test is to be preformed whilst samples are at 120° C.

EXAMPLE I

Using 100 parts by weight of Natural Rubber which was mixed as detailed below in Table I and with reference to Page 4, and tested according to the methods detailed on Pages 5 and 6.

TABLE I

| | Addition of Rubber (Parts) | | |
|---|---|---|---|
| Mixing Sequence | Control | EX Y | EX Z |
| 1st stage mix | 100 | 65 | 50 |
| Remill | * | * | * |
| 2nd stage mix | — | 35 | 50 |
| Remill | — | * | * |
| Addition of sulphur, accelerators etc. | * | * | * |

The rubber compositions resulting from the above mixing procedures were tested with the results shown in Table II below.

TABLE II

| Physical tests | Control | EX Y | EX Z |
|---|---|---|---|
| Modulus (300%) (MN/m$^2$) (ASTM D412) | 18 | 18 | 18 |
| Rebound hot (%) ASTM D1054 | 65 | 68 | 69 |
| Hot Compound adhesion ASTM KN/M | 9 | 50 | 50 |
| Hot Instron Tear KN/M ASTM | 40 | 55 | 52 |
| **Adhesion to cord KN/M static | 61 | 94 | — |
| Demattia Flex life ASTM D813 | 5 | 18 | — |
| Wire adhesion SBAT | 298 | — | 398 |
| Aged Wire adhesion | | | |
| 3 Days Water 90° C. | 266 | — | 304 |
| 10 Days Air 110° C. | 294 | — | 291 |

*These operations performed as part of the mixing sequence.
** Adhesion to aromatic polyamide treated cord.

Thus it can be seen from the test results, that mixing all the carbon black with a portion of the natural rubber, and then diluting this mix with the remaining natural rubber has effected some physical properties, when compared with the physical properties of the traditional one-stage control mix.

For example, the fatigue life has been increased, the adhesion and tear properties have been greatly increased, and the hysteresis loss has been reduced. All these benefits have been achieved only by differing the mixing procedures.

EXAMPLE II

Using a mixture of natural rubber and polybutadiene rubber with a total rubber content of 100 parts, the rubber contents and mixing sequences are detailed below in table III.

The NR and BR were blended together prior to addition at the second stage. The ratio of the NR/BR for the different samples was as shown in Table III, however, it was found that it is preferable where possible to add the second stage rubber material as a 3:1 blend by weight of NR:BR respectively.

The rubber compositions resulting from the mixing sequences of Table III were then tested with the results as detailed in Table IV below.

TABLE III

| Mixing Sequence | Addition of Rubber (Parts) | | | | | | | |
|---|---|---|---|---|---|---|---|---|
| | Control | A | B | C | D | E | F | G |
| 1st stage addition of rubber | 100 | 87.5 NR 12.5 PBD | 85 NR 15 PBD | 70 NR 30 PBD | 50 | 50 | 50 | 50 |
| Remill | * | * | * | * | * | * | * | * |
| 2nd stage addition of rubber | — | — | — | — | 37.5 NR 12.5 PBD | 32.5 NR 17.5 PBD | 25 NR 25 PBD | 17.5 NR 32.5 PBD |
| Remill | — | — | — | — | * | * | * | * |
| addition of Sulphur, Accelerators, etc. | * | * | * | * | * | * | * | * |

*These operations performed in the mixing sequence.

TABLE IV

| PHYSICAL TESTS | Control | A | B | C | D | E | F | G |
|---|---|---|---|---|---|---|---|---|
| 300% Modulus KN/M$^2$ | 18 | 18 | — | 16 | 17 | 17 | 16 | 16 |
| Hot Rebound % | 66 | 68 | 66 | 66 | 69 | 72 | 70 | 70 |
| Compound Adhesion KN/m | 7 | 15 | 7 | 20 | 30 | 33 | 31 | 32 |
| Instron Tear KN/m | 45 | 30 | 20 | 20 | 45 | 53 | 38 | 40 |
| Demattia Flex Life hours | 5 | — | 21 | — | 28 | — | — | — |
| Wire Adhesion KN/m | 298 | 337 | 425 | 435 | 348 | 418 | 480 | 416 |
| Aged Wire Adhesion KN/m | | | | | | | | |
| 3 days Water 90° | 266 | 246 | — | — | 294 | 236 | 278 | 262 |
| 10 days Air 110° | 294 | 309 | — | — | 318 | 312 | 312 | 285 |
| Textile Cord Adhesion KN/m | 78 | — | 99 | — | 116 | — | — | — |

It can be seen from the results that the tear strength, and adhesion properties of the material are improved for the two-stages mixed compounds D, E, F, and G, containing BR; as compared with the conventional one-stage mixed compounds A, B, or C, containing BR. Furthermore there is also a slight improvement in hysteresis and an improvement in fatigue properties over and above the single stage mix compounds. Thus it can be seen that the phase mixed NR/BR compounds have the improved fatigue life of such compounds when compared with the NR control, but with no sebsequent loss of tear properties normally associated with mixing Br into NR.

Whilst the invention has been described with reference to the use of polybutadiene as an optional additional high unsaturation rubber, it is considered that other high unsaturation rubbers such as vinyl polybutadiene could be used. By vinyl polybutadiene is meant a polybutadiene rubber containing greater than 20% of vinyl 1,2 structure. Otherwise, the term "polybutadiene" as used herein refers to cis 1,4-polybutadiene which typically contains less than about 5 percent of a vinyl 1,2-structure.

In the practice of this invention and as a preferred embodiment thereof, for the second mixing stage, the remaining cis 1,4 polyisoprene, preferably as natural rubber, and the high unsaturation rubber, preferably as polybutadiene rubber, are added as a blend composed of a weight ratio in the range of 3/1 to 1/3 of polyisoprene to polybutadiene.

In one aspect and as an additional embodiment of this invention, a rubber composition is provided which is prepared according to the process of this invention.

In another aspect and as a further embodiment of this invention, a composite is provided which comprises the rubber composition of this invention containing a filament reinforcement. Such filament can typically be composed of one or more filaments. In the case of multiple filaments, they can be in the form of a cord of filaments twisted together. Contemplated filamentary material includes metal wire and organic polymer textile filaments formed from organic polymers such as, for example, nylon and aramid materials.

In practice, it is comtemplated that the process of this invention is suitable for the preparation and making of a tire reinforcing ply coating composition.

Whilst the invention has been illustrated with reference to the described example, it is believed that it is within the scope of the skilled man to make minor modifications thereto without departing from the scope and spirit of the invention.

I claim:

1. A process for preparing a rubber composition, where the rubber consists essentially of cis 1,4-polyisoprene and polybutadiene, which comprises:
    (A) 100 parts by weight of rubber comprising 80 to 90 parts by weight of cis 1–4 polyisoprene and 10 to 20 parts by weight polybutadiene rubber,
    (B) 40–70 parts by weight of carbon black and
    (C) rubber vulcanization aid including accelerators and sulfur, and other processing additives,
    the process comprising mechanically mixing the composition under shear conditions in at least two consecutive stages, where in the first stage all the carbon black is mixed with at least 50 parts by weight of the cis 1–4 polyisoprene and the said number of parts of polyisoprene does not exceed more than 80% of the total polyisoprene content of the rubber, and in the second stage the remaining cis 1-4 polyisoprene, alone or as a pre-blend with said polybutadiene rubber, is mixed into the composition.

2. A process according to claim 1, wherein 60 to 70 parts by weight of the cis 1-4 polyisoprene is mixed with 55 to 60 parts by weight of carbon black at the first stage of the process.

3. A process according to claim 1, wherein the remaining cis 1,4-polyisoprene and the polybutadiene added at the second stage are added as a pre-blend composed of a weight ratio in the range of 3/1, to 1/3.

4. A process for making a tire reinforcing ply coating composition according to the process of claim 1.

5. The process according to claim 1 wherein said polybutadiene rubber is vinyl polybutadiene and wherein the remaining cis 1,4-polyisoprene and the said vinyl polybutadiene added at the second stage are added as a pre-blend composed of a weight ratio in the range of 3/1 to 1/3.

* * * * *